United States Patent [19]
Simeonov et al.

[11] 4,248,760
[45] Feb. 3, 1981

[54] METHOD OF OBTAINING COMPOSITE MATERIALS AND PRODUCTS, PARTICULARLY FOR CONSTRUCTION AND BUILDING PURPOSES, BASED ON UREA-FORMALDEHYDE RESINS BY ADDITION OF PHOSPHOGYPSUM

[75] Inventors: Yordan T. Simeonov; Valeri M. Cheshkov; Georgi Z. Zahariev, all of Sofia, Bulgaria

[73] Assignee: Centralna Laboratoria Po Physiko-Chimicheska Mechanika pri Ban, Sofia, Bulgaria

[21] Appl. No.: 57,546

[22] Filed: Jul. 13, 1979

Related U.S. Application Data

[63] Continuation-in-part of Ser. No. 735,283, Oct. 26, 1976, abandoned.

[30] Foreign Application Priority Data

Oct. 31, 1975 [BG] Bulgaria ............................ 31382

[51] Int. Cl.$^3$ .............................................. C08L 61/24
[52] U.S. Cl. ........................ 260/39 SB; 260/29.4 R; 528/266
[58] Field of Search ................... 528/266; 260/39 SB, 260/29.4 R

[56] References Cited

U.S. PATENT DOCUMENTS

| | | | |
|---|---|---|---|
| 2,056,142 | 9/1936 | Ripper | 260/71 |
| 2,879,152 | 3/1959 | Coleman | 71/53 |
| 3,160,495 | 12/1964 | Smith et al. | 71/32 |
| 3,172,751 | 3/1965 | Datin | 71/40 |
| 3,450,652 | 6/1969 | Lin | 260/15 |

OTHER PUBLICATIONS

Chem. Absts. vol. 81;154769s, "Mastic", Mosh Chanskii et al.
Chem. Absts. vol. 80:84317w, "—Filled U/F Composition-Structures", (Mironov et al.).
Chem. Absts., vol. 83:84119v, "—Mixture-Production-Materials," Tarasenko et al.
Chem. Absts. vol. 68:78959t, "gypsum Polymer—M/F Resin," Kornienko et al.
Chem. Absts. vol. 82:102465r, "Waterproof-Gypsum Products with High Mechanical Strength," Murayama et al.
Chem. Absts. vol. 77:35718g, "Urea Resin Molding Products", Suzuki.

*Primary Examiner*—Edward M. Woodberry
*Attorney, Agent, or Firm*—E. Janet Berry

[57] ABSTRACT

This invention relates to a method for obtaining materials and products based on urea-formaldehyde resin. Thus, the invention is a method of obtaining composite materials and products, particularly for construction and building purposes, based on urea-formaldehyde resins. It relates particularly to cast materials and products. As the active filler and curing agent for the urea-formaldehyde resin there is used phosphogypsum, which is a by-product of phosphoric acid production and which can be used either moist or dried. Moist phosphogypsum usually contains 40 weight percent of water and is added in up to 40 to 90 weight percent of the overall mixture. The dried phosphogypsum contains only water of crystallization since its "loose" water has been extracted. It is added in quantities of from 30 to 50 weight percent of the overall mixture. This method does not require special temperatures and pressures, i.e., it can be used at atmospheric pressure and at room temperature. Some heating and increased pressure can be used if desired.

Depending on the ratio of the initial components, materials of a wide spectrum of physical and mechanical properties can be obtained. The new materials and products find diverse applications in the fields of construction (building) and industry, e.g., for dividing walls, paneling, heat insulation, tubes, adhesive and the like.

4 Claims, No Drawings

METHOD OF OBTAINING COMPOSITE MATERIALS AND PRODUCTS, PARTICULARLY FOR CONSTRUCTION AND BUILDING PURPOSES, BASED ON UREA-FORMALDEHYDE RESINS BY ADDITION OF PHOSPHOGYPSUM

This application is a continuation-in-part application of copending application Ser. No. 735,283, filed Oct. 26, 1976 and now abandoned.

The invention relates to a method for curing urea-formaldehyde resins, particularly at normal conditions - ambient temperature and atmospheric pressure, which curing method can be applied in manufacturing construction materials and products.

Thus, the invention comprises a method of obtaining composite materials and products, particularly for construction and building purposes, based on urea-formaldehyde resin.

A method is known for curing urea-formaldehyde resins by means of acid catalysts such as ammonium chloride, oxalic acid, etc.

A serious disadvantage of this method is that with the passage of time, the products cured at normal conditions crack and disintegrate so that it cannot be applied in practice. All attempts to overcome the said disadvantage have just failed.

The object of this invention is to provide a method for curing urea-formaldehyde resins and particularly at normal conditions which insures the obtaining of finished product which would not crack and disintegrate with time.

According to the invention, to the urea-formaldehyde resins is added phosphogypsum. It is possible to introduce moist or dry phosphogypsum as well as a combination of both types. The weight content of the moist phosphogypsum can be varied from 40% to 90% resp. in using dried phosphogypsum 30% to 50% with respect to the composition resin phosphogypsum. The change of the qualitative and quantitative content of the phosphogypsum as well as the introduction of conventional fillers make it possible to obtain compositions with different properties.

Moist phosphogypsum is phosphogypsum which is a by-product in the form of a sludge or suspension (according to the definition in the Encyclopedia) and which usually contains up to 40% weight of free water and in addition contains 20% weight of crystallisation water, as it is in the form of calcium sulfate dihydrate ($CaSO_4.2H_2O$). Dry phosphogypsum is phosphogypsum which as a result of thermal treatment does not contain free water but contains only crystallisation water—20% weight. In itself it is also $CaSO_4.2H_2O$.

In the chemical industries certain processes yield calcium sulfate as a by-product or waste, as in the treatment of the calcium phosphates with sulfuric acid (see Phosphoric acids). Such by-product, sometimes called "by-product gypsum", is normally in the form of a sludge or suspension of the dihydrate and there have been only minor operations in the utilization of this material (Encyclopedia of Chemical Technology, edited by Raymond E. Kirk and Donald F. Othmer, Interscience Encyclopedia, Inc., New York, N.Y. 1951, Volume 2, page 770, lines 20-24). The main reactions in the first stage are decomposition of phosphate rock by phosphoric acid:

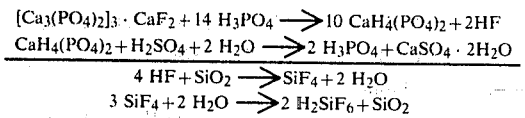

$$[Ca_3(PO_4)_2]_3 \cdot CaF_2 + 14 H_3PO_4 \longrightarrow 10 CaH_4(PO_4)_2 + 2HF$$
$$CaH_4(PO_4)_2 + H_2SO_4 + 2 H_2O \longrightarrow 2 H_3PO_4 + CaSO_4 \cdot 2H_2O$$
$$4 HF + SiO_2 \longrightarrow SiF_4 + 2 H_2O$$
$$3 SiF_4 + 2 H_2O \longrightarrow 2 H_2SiF_6 + SiO_2$$

(Encyclopedia of Chemical Technology, edited by Raymond E. Kirk and Donald F. Othmer, Interscience Encyclopedia, Inc. New York, N.Y. 1951, Vol. 6, page 417 last 5 lines on page).

The advantage of the invention is not only that the obtained finished products do not crack and disintegrate with time, but also the considerable widening of the field of application of urea-formaldehyde resins which is very wide spread and more available in comparison with the other synthetic thermoreactive polymers. Another very important advantage is that it becomes possible to utilize large amounts of phosphogypsum, the latter being a waste product of the production of mineral fertilizers. The product obtained according to the proposed method can be very easily formed and treated and has a very high thermal resistance thus making it very suitable for manufacturing construction panels as well as for the production of lining and construction materials, floorings, tubes, foamed plastics, etc.

EXAMPLE 1

To 1 weight part of urea-formaldehyde resin are added 3 weight parts of moist phosphogypsum containing up to 40% weight of free water and 20% weight of crystallisation water. The mixture is agitated for 5 minutes and is poured in moulds. The gelatinization of the mixture at normal conditions begins after approximately 10 minutes and the curing after approximately 30 minutes.

Characteristics of the cured composition after 10 days and nights: shrinkage—1.1%, tensile strength—$1 \times 10^6$ N/m$^2$, crushing strength—$4.5 \times 16^6$ N/m$^2$, bending strength—$2.5 \times 10^6$ N/m$^2$, water absorption—40%, change in the strength properties after water saturation: reduction by 50% and after drying - complete recuperation, no swelling in water, density—950 kg/m$^3$, thermal resistance - in heating during 1 h at 1000° C. the specimen is retaining its form.

EXAMPLE 2

To 3 weight parts of urea-formaldehyde resin are added 2 weight parts of dry phosphogypsum containing 20% weight of crystallisation water. The mixture is agitated for 5 minutes and is poured in moulds. The gelatinization of the mixture at normal conditions begins nearly immediately after pouring and the curing after approximately 15 minutes.

Characteristics of the cured composition after 10 days and nights shrinkage—1.7%, tensile strength—$5 \times 10^6$ N/M$^2$, crushing strength—$30 \times 10^6$ N/m$^2$, bending strength—$10 \times 10^6$ N/m$^2$, water absorption—2%, change in the strength properties after water saturation: increase with 20%: swelling in water-medium: none: density: 1050 Kg/m$^3$: thermo resistance: at a 1 hour heating under 1000° C. the sample keeps its shape intact.

Characteristics of the cured composition after 30 and after 90 days and nights: tensile strength—$10 \times 10^6$ and $12 \times 10^6$ N/m$^2$ respectively; crushing strength—$40 \times 10^6$ and $60 \times 10^6$ N/m$^2$ respectively; bending strength—$14 \times 10^6$ and $25 \times 10^6$ N/m$^2$ respectively.

The example shows that with the time the mechanical properties of the finished products cured according to the proposed method are improving.

What is claimed is:

1. A method for curing urea-formaldehyde resins for obtaining composite materials and products for use in construction and for building purposes which comprises adding to said resins, phosphogypsum in the form of calcium sulfate dihydrate, $CaSO_4.2H_2O$, containing from 0 up to 40 weight percent of free water, said phosphorgypsum being added in from 30 up to 90 weight percent of the total composition of resin-phosphogypsum.

2. Method according to claim 1 wherein moist phosphogypsum containing 20% weight of crystallisation water and up to 40% weight of free water is added in amounts of 40–90 weight % with respect to the total composition resin-phosphogypsum.

3. Method according to claim 1 wherein dried phosphogypsum containing 20% weight of crystallisation water is added in amounts of 30–50 weight % with respect to the total composition resin-phosphogypsum.

4. Method of claim 1 in which the curing is carried out at ambient temperature and atmospheric pressure.

* * * * *